United States Patent [19]

Arai et al.

[11] 4,133,756

[45] Jan. 9, 1979

[54] METHOD FOR DEHYDRATING A MIXED DUST SLURRY

[75] Inventors: Izumi Arai, Chigasaki; Yasuteru Yamada; Akio Mutsuta, both of Wakayama; Kenji Kadota, Niihama, all of Japan

[73] Assignees: Sumitomo Heavy Industries, Ltd., Tokyo; Sumitomo Metal Industries, Ltd., Osaka, both of Japan

[21] Appl. No.: 830,196

[22] Filed: Sep. 2, 1977

Related U.S. Application Data

[63] Continuation of Ser. No. 659,781, Feb. 20, 1976, abandoned.

[51] Int. Cl.² .............................................. B01D 33/10

[52] U.S. Cl. .......................................... 210/67; 34/46; 210/68; 210/71; 210/77

[58] Field of Search ....................... 210/67, 68, 71, 77, 210/79, 86, 93, 96 R, 107, 143; 162/DIG. 6, DIG. 10, DIG. 11, 258, 259; 55/385 D; 266/147; 34/46; 432/54; 198/37

[56] References Cited

U.S. PATENT DOCUMENTS

| | | | |
|---|---|---|---|
| 3,344,921 | 10/1967 | Fegan | 210/68 |
| 3,396,514 | 8/1968 | Hurst et al. | 266/147 |
| 3,815,745 | 6/1974 | Bondarey et al. | 210/96 |

FOREIGN PATENT DOCUMENTS

| | | | |
|---|---|---|---|
| 626804 | 9/1961 | Canada | 210/143 |

*Primary Examiner*—Frank Sever
*Attorney, Agent, or Firm*—Kurt Kelman

[57] ABSTRACT

A method is disclosed for feeding a constant amount of filter cake to a dryer thereby producing dried powder having a predetermined moisture content so that materials of uniform quality are fed at a constant rate to the stages subsequent to the dryer in a pelletizing system of the iron and steel industry.

6 Claims, 5 Drawing Figures

METHOD FOR DEHYDRATING A MIXED DUST SLURRY

This is a continuation, of application Ser. No. 659,781, filed Feb. 20, 1976 now abandoned.

FIELD OF THE INVENTION

The present invention relates to a method for dehydrating and drying a slurry comprising mainly dust discharged from furnaces in a steel plant and more particularly to those for dehydrating and drying the dust slurry so as to feed the processed dry powder at a constant rate and volume.

BACKGROUND OF THE INVENTION

These days the pollution problem is becoming one of the major concerns in many industries. In the iron and steel industry, it has become necessary to treat the dust discharged from the various types of furnaces in order to reduce or eliminate the environmental pollution caused by such dust. Usually such dust is caught and retained by means of collectors within the plant and then disposed of by one or more ways — burning, dumping, using as aggregate, etc.

One way of re-utilizing such collected dust is to use it as part of the materials for sintering processes, for example, for producing pellets. However, due to the large volume of dust collected, particularly that part consisting of fine particles, only a part of the dust has been re-utilized to date and most has been dumped. The dumping also creates a pollution problem and, also, the dumping of the reusable materials contained therein constitutes a big waste.

Therefore, in order to reduce pollution as well as to save resources, full-reutilization of the iron and steel industry dust has been considered, and ways of reusing such dust generally fall into two categories, that is:

A. Mixing the dust with a suitable binding agent to produce building or constructing materials which are to be used outside the steel industry; and B. Recycling the dust within the steel industry where the dust is produced as a resource for manufacturing iron and/or steel by modifying the composition and shape of the dust.

The present invention is related to recycling the dust as mentioned in "B" above and particularly to the manufacture of pellets comprised mainly of the dust collected by wet type equipment such as venturi-scrubber precipitator or the like.

In the course of producing pellets from the dust collected by the wet type collector, the water is removed from the dust, contained in a slurry state and, after dehydration, the dust is in the state of a cake is which, hereinafter referred to as "filter cake". This filter cake is then fed to the next stages including a drying stage before being fed to a pelletizing apparatus.

If the quantity or moisture content of the filter cake supplied to the drying stage and the stages succeeding thereto varies, such variation influences the next stages remarkably. Therefore, in drying the filter cake, it is necessary to provide a means for controlling heating capacity over a relatively wide range to meet the variation in quantity of the filter cake supplied. Also, if the moisture content of the filter cake is high, large heating capacity is required and this increases the fuel cost.

Thus, there has been a need for a process insuring that the filter cake is supplied to the dryer and the following stages at a constant rate and with the moisture content held within predetermined limits.

SUMMARY OF THE INVENTION

Accordingly, it is an object of the present invention to provide a method for supplying filter cake to a dryer at a constant rate, the filter cake being produced from the dust contained in a slurry collected from steel furnaces.

Still another object of the present invention is to continuously dehydrate the dust-containing slurry to produce a filter cake having a uniform moisture content.

It is a further object of the present invention to feed the filter cake produced from the dust-containing slurry to the next stages for producing pellets at a constant rate.

The objects above are achieved by the present invention wherein dust in slurry state from a blast furnace (shaft furnace), a steel manufacturing furnace (converter), a sintering equipment and so on is mixed in a certain ratio with dry dust. During the development of the present invention, it was found that the concentration of the mixed slurry is one of the important factors to achieve the objects.

Consequently, in the present invention, the mixed slurry dehydrated by an appropriate filter such as a rotary vacuum filter adapted for continuous dehydrating or filtering (hereinafter referred to as a rotary type belt filter) is fed to a conveyor belt with which a weighing device is associated to regulate the output of the filter and the speed of the belt filter in accordance with the weight as measured by the weighing device in order to feed the filter cake at a constant rate. Further, the concentration of the mixed slurry is maintained within a proper range to obtain a filter cake of a predetermined moisture content.

The invention will further be explained hereinafter with reference to several tables and accompanying drawings.

DETAILED DESCRIPTION OF THE PREFERRED EMBODIMENT

We have found according to the test results obtained by using a rotary type vacuum filter that the moisture content of the filter cake may be kept substantially constant if the concentration of the mixed slurry mainly comprising blast furnace dust and converter dust is maintained within a certain range even if the rotational speed of that filter is varied to some extent. It has been known that, in case of drying the filter cake by a rotary dryer or the like to a certain moisture content, the amount processed is closely related to the temperature of the gas discharged from the dryer.

Figure 1:
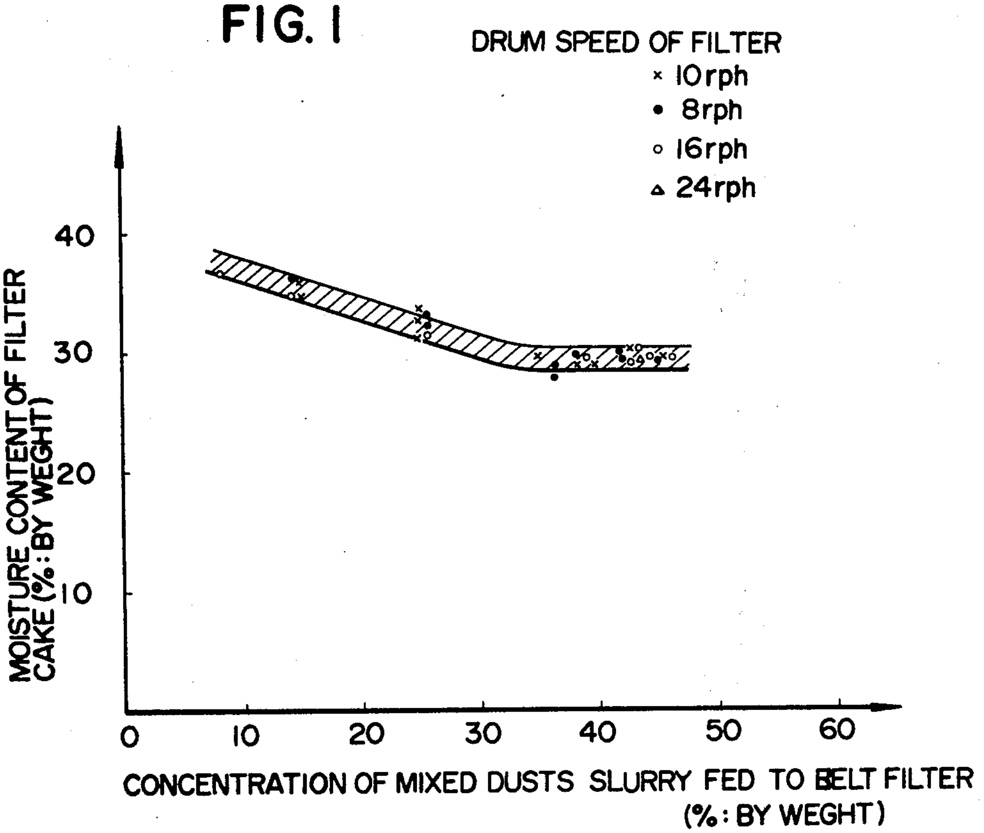
FIG. 1 illustrates the relationship between moisture content in the filter cake and the concentration of the mixed dust slurry.

The relationship between moisture content in the filter cake and the concentration of mixed dust slurry is illustrated in FIG. 1. It is clear from this drawing that the moisture content of the obtained filter cake becomes substantially constant when the concentration of the mixed slurry fed to a rotary filter is approximately within a range of 35–45% (by weight) and the moisture content of the filter cake is almost constant, say approximately 30% (by weight) for the concentration range above. It is also noted that some variation in the rotational speed of the filter scarcely affects the moisture content of the filter cake. The graph of FIG. 1 was obtained by the test explained below.

The mixed slurry was prepared by mixing the blast furnace dust slurry and the converter dust slurry in a 1 to 3 ratio by dry weight. The physical factors of both slurries are presented in Table I below. Into this mixture, dry dust caught by or collected on collectors of the dry type was added in order to obtain slurry mixtures of various concentrations.

In Table II below, certain physical properties of the dry dust used for such addition above are presented. Also in Table III below, the composition of each slurry employed is given.

Table I (Slurry)

| | True Specific Gravity | Dust Particle Dia. (mm) | | | | |
|---|---|---|---|---|---|---|
| | | >0.295 | 0.295–0.147 | 0.143–0.074 | 0.074–0.063 | <0.063 |
| Blast Furnace Dust Slurry | 2.5 | 0.3 | 4.2 | 17.2 | 13.4 | 64.9 |
| Converter Dust Slurry | 5.0 | 0.3 | 1.5 | 2.6 | 2.5 | 93.2 |

Note:
1. True Specific Gravity was measured by Pycnometer.
2. Particle Dia. was measured by Wet Sieve Process and the Values are indicated in %.

Table II (Dry Dust)

| Furnace | True Specific Gravity | Dust Particle Dia. (mm) | | | | |
|---|---|---|---|---|---|---|
| | | >0.295 | 0.0295–0.147 | 0.147–0.074 | 0.074–0.044 | <0.044 |
| Blast Furnace (Top and Front of Furnace) | 3.40 | 1.2 | 20.9 | 52.8 | 19.3 | 5.8 |
| Converter Dry Electrostatic 4.42 Precipitator | 0.1 | 0.2 | 0.4 | 1.3 | 98.0 | |
| Sintering Electrostatic Precipitator | 3.82 | 0.7 | 13.7 | 39.5 | 18.9 | 27.8 |

Note:
Note for Table I is applicable to this Table II.

Table III (Dust Compositon %)

| | C | $SiO_2$ | $Fe_2O_3$ | FeO | $Al_2O_3$ | Others |
|---|---|---|---|---|---|---|
| Blast Furnace Dust Slurry | 46.5 | 6.5 | 34.5 | 0.6 | 3.3 | 8.6 |
| Converter Dust Slurry | 0.4 | 1.7 | 26.0 | 60.5 | <0.01 | 11.5 |
| Blast Furnace Dust (Top and Front) | 29.35 | 6.59 | 39.59 | 2.62 | 2.53 | 19.32 |
| Converter Dry Electrostatic Precipitator dust | 0.27 | 1.11 | 88.79 | 0.83 | 0.45 | 8.55 |
| Sintering Electrostatic Precipitator | 3.58 | 7.36 | 63.04 | 4.77 | 2.44 | 18.81 |

Table III-continued (Dust Compositon %)

| | C | $SiO_2$ | $Fe_2O_3$ | FeO | $Al_2O_3$ | Others |
|---|---|---|---|---|---|---|
| dust | | | | | | |

The test above was conducted by using a belt filter having a drum diameter of 3600 mm.

Figure 2:
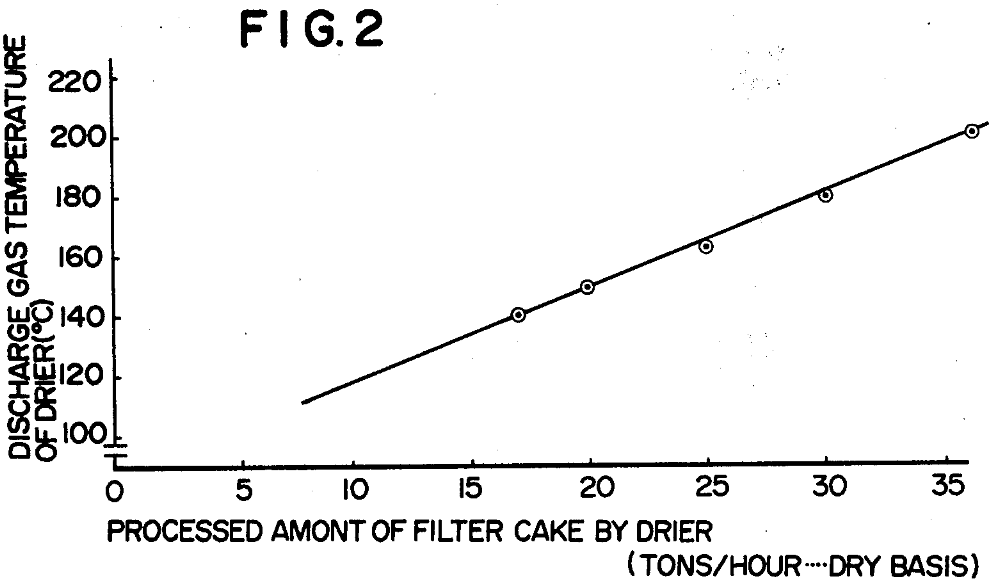
FIG. 2 illustrates the relationship between the processed amount of filter cake by the drier and the discharge gas temperature of the drier.

Another test was conducted using the same slurries as those employed in the test first mentioned. In this second test, the concentration of the mixed slurry was adjusted to within the range of 35–45% (by weight) and six belt filters were used, each having a drum diameter of 3600 mm. Filter cake was produced at a rate of 10–36 tons/hour on a dry basis. The filter cake obtained by the above process was dried by employing a rotary dryer having an inside diameter of 4.2 m and an axial length of 36 m and the results of this drying stage are shown in the curve of FIG. 2 which indicates the substantially linear relationship between the amount of filter cake processed in the dryer and the discharge gas temperature of the dryer. The test operation was conducted to control the moisture content of the dried filter cake to within 1.0–2.0% (by weight) and the moisture content of the filter cake charged into the dryer was 28% (by weight). This linear relationship will also be established when the moisture content of the filter cake used is varied or different from that of the test conducted. According to the results shown in FIG. 2, it is noted that dried filter cake having a uniform moisture content may be obtained if the discharge gas temperature of the dryer is controlled in accordance with the amount of filter cake charged into the dryer when the amount of filter cake having a fixed moisture content fed to the dryer is varied.

As previously explained, in order to carry out smooth and continuous operation in the systems after drying in a dust treating process or a process of manufacturing pellets from dust, it is important that the filter cake and the dried filter cake or powder produced have a fixed or predetermined moisture content.

For example, in a pelletizing process utilizing dust as the main raw material, it is an almost indispensable factor to feed dried powder having a uniform moisture content to a pelletizing system wherein water is added to the dried powder within the system, since it makes it easy to operate the pelletizer and enables the production of raw pellets of uniform quality. If the moisture content of the dried powder varies from a certain predetermined value, it may cause clogging in the feeding devices in the stages of the system after the dryer or it may adhere to the several chutes employed in the system. These troubles makes it impossible to operate the dust treating system without interruption.

Figure 3:
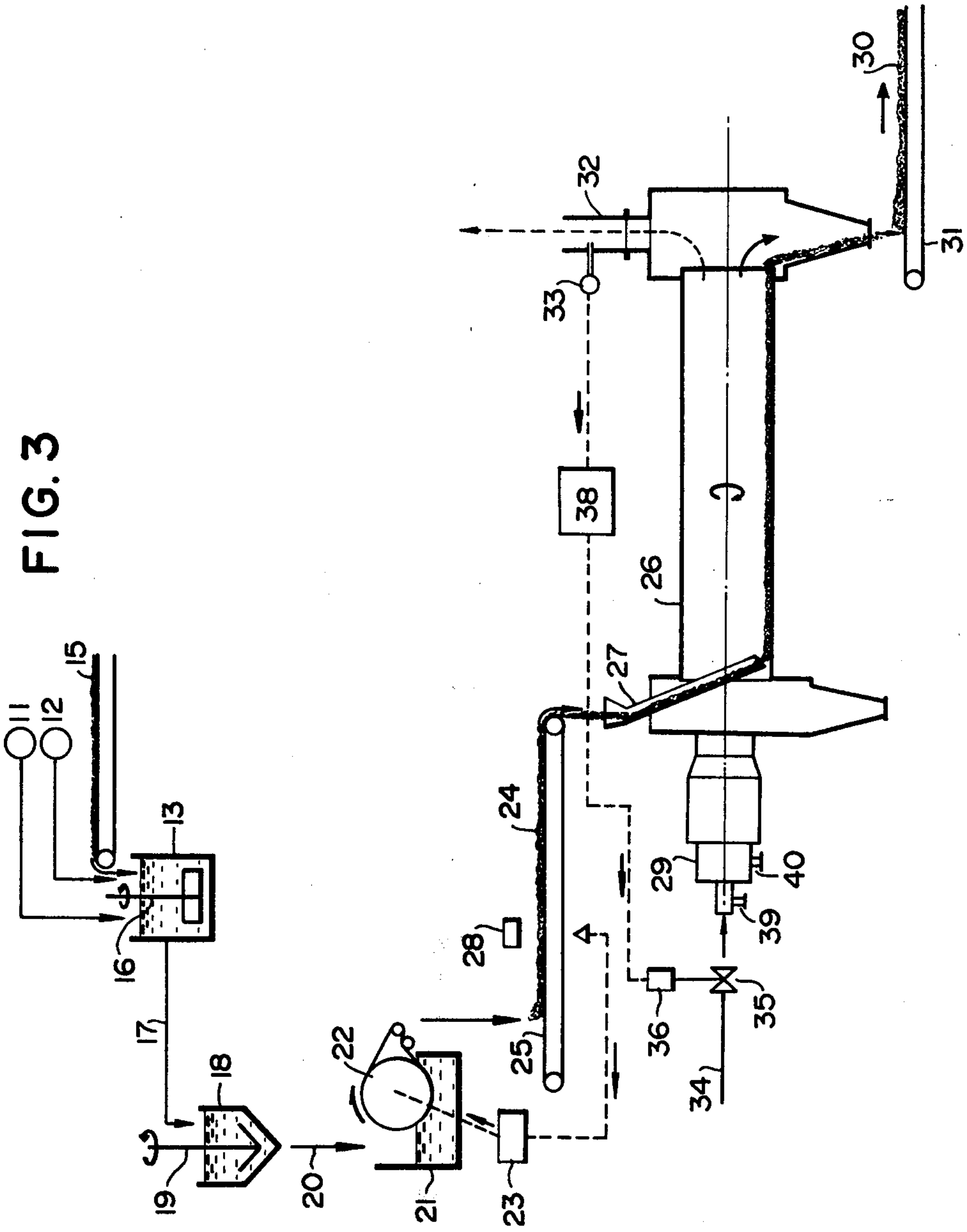
FIG. 3 shows a schematic system from a dust supply station to a drier.

Referring to FIG. 3, there is shown a schematic illustration of the system for treating the dust discharged from several types of furnace used in the iron and steel industry.

A blast furnace dust slurry and a converter dust slurry are fed through conduits 11 and 12 to a mixing bath 13. Also, in order to maintain the concentration of the mixture of the slurries (mixed slurry) approximately in the range of 35–45% (by weight), the dry dust collected by dry type collectors is fed through a conveyor 15 into the bath 13 and the whole mixture is agitated by a mixing agitator 16 associated with the bath 13. All of the mixed slurry is then directed to a stirring basin 18 through a mixed slurry conduit 17. The basin 18 is equipped with a suitable stirring means such as a rotatable stirrer 19 to maintain the uniformity of the mixed slurry. The mixed slurry is thence fed through a conduit 20 to a receiving vessel 21 where a drum type belt filter 22 is disposed. The rotational speed of the belt filter is variable and the belt filter is equipped with a variable speed drive 23. Rotation of the belt filter 22 produces filter cake 24 having a fixed or predetermined moisture content as shown in FIG. 1 if the concentration of the mixed slurry is within a predetermined range. The filter cake 24 is discharged onto a conveyor 25 which delivers the filter cake 24 through a chute 27 to a rotary dryer 26. A suitable weighing device 28 is associated with the conveyor to sense the variation in amount of the filter cake discharged onto the conveyor and to regulate the variable drive 23 to control the rotational speed of the belt filter 22 so that the filter cake is supplied at a constant rate to the dryer 26.

A hot air generator 29 is associated with the dryer 26 which dries the filter cake and discharges it as powder 30. The dried powder is conveyed to the next stage by a conveyor 31. Also, there is provided an exhaust duct 32 to which a temperature detector 33 is coupled to sense the temperature of the exhaust gas. According to the temperature of the exhaust gas thus sensed by the detector 33 and the value obtained by the weighing device 28, it is possible to control the fuel supplied to the hot air generator through a fuel supply conduit 34 to set and maintain the temperature at the detector 33 at a desirable value in order to produce dried powder having a fixed or predetermined moisture content at a constant rate. To such end, a flow regulator valve 35 is disposed in the fuel supply conduit 34 with which an actuator 36 is coupled. The actuator 36 is adapted to receive a signal from a control unit 38 which receives temperature information from the detector to generate the signal. The signal controls the actuator 36 to determine the opening degree of the valve 35. Also, two air intake pipes 39 and 40 are connected to the hot air generator, the pipe 39 being adapted to introduce air necessary for combustion of fuel while the pipe 40 introduces fresh air for controlling the temperature of hot air.

Figure 4:
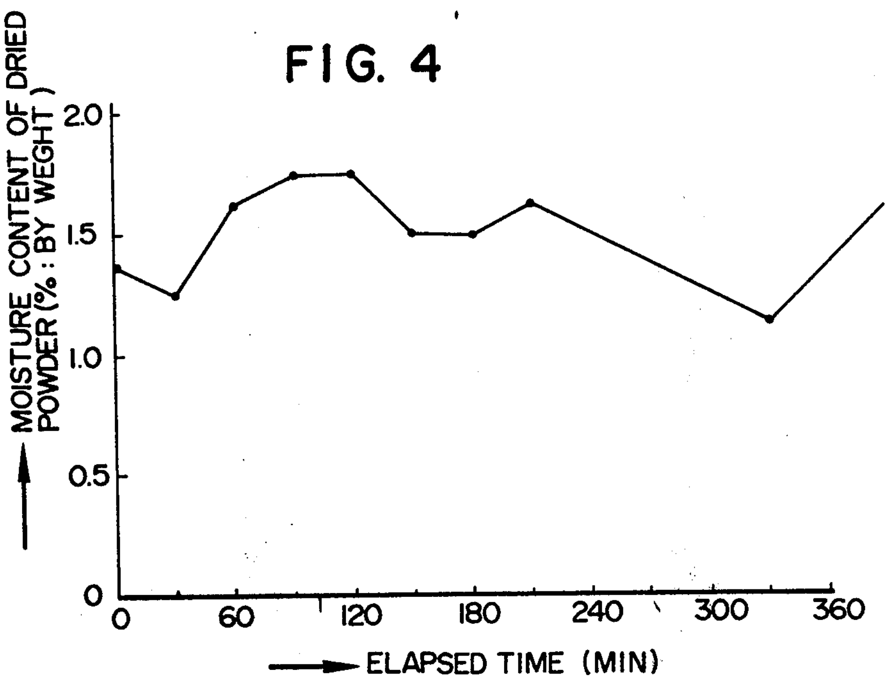
FIGS. 4 and 5 illustrate the uniformity of the operation according to the present invention.
Figure 5:
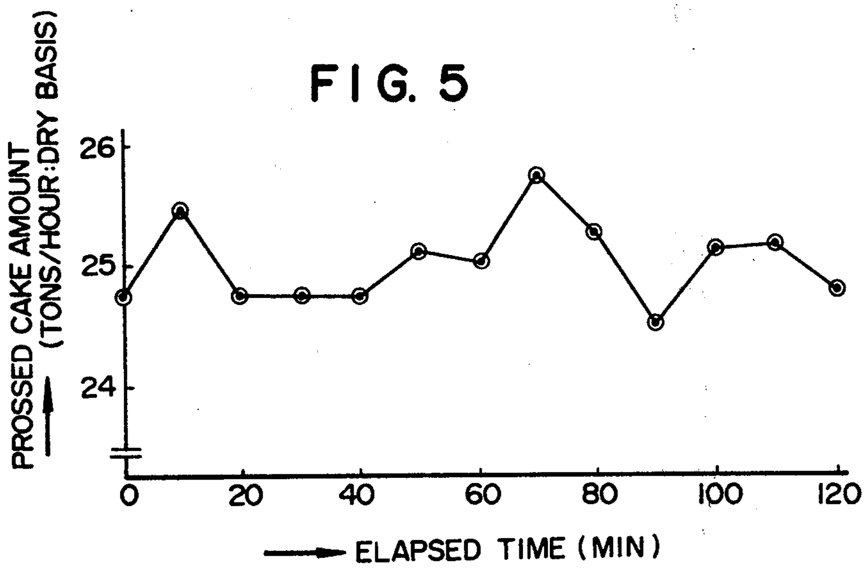

In FIGS. 4 and 5, the degree of uniformity and rate of the operation according to the present invention is illustrated.

The range in the variation of moisture content obtained by the process of the present invention is plotted in FIG. 4 wherein the aim was to obtain a moisture content of 1.5%. The variation in amount of filter cake processed is shown in FIG. 5. The moisture content and the uniformity in the output of the dryer were within quite a satisfactory range to smoothly and continuously operate the next or subsequent stages of the pellet manufacturing system.

While the present invention has been explained in detail, variation and modification thereof are, of course, available to those skilled in the art within the spirit and scope of the present invention. For example, any type of filtering device such as a conveyor type, rotary drum filter type, cylindrical or belt type may be employed. Also, a type of dryer other than the rotary type may be employed.

What is claimed is:

1. In a method for dehydrating a dust-containing slurry mixture of a blast furnace slurry and a converter slurry collected in iron and steel works to produce a filter cake and feeding the filter cake thus produced to a stage for recovering dust, the slurry mixture being fed to a rotary type belt filter for dehydration, the steps of maintaining the solid dust concentration of the mixture within a range of 35% to 45%, by weight, before the mixture is fed to the filter such that the moisture content of the filter cake produced on the filter is kept substantially constant at about 30% by weight regardless of variations in the rotational speed of the filter.

2. In the method of claim 1, the further steps of charging the filter cake into a dryer before feeding it to the stage for recovering dust, the rate of charging the filter cake to the dryer is monitored, the temperature of exhaust gas coming from the dryer is monitored, and the temperature is controlled relative to the rate of charging the filter cake to the dryer.

3. In the method of claim 1, the step of adjusting the rotational speed of the filter to obtain a desired output rate of the filter cake from the filter.

4. In the method of claim 1, the steps of monitoring the weight of the filter cake discharged from the filter and adjusting the rotational speed of the filter in response to the monitored weight.

5. In the method of claim 3, the further steps of charging the filter cake output from the filter into a dryer for drying the filter cake while removing exhaust gas from the dryer, and controlling the charged amount of the filter cake in response to the temperature of the exhaust gas.

6. In the method of claim 3, the further steps of charging the filter cake output from the filter into a dryer for drying the filter while removing exhaust gas from the dryer, and controlling the temperature of the exhaust gas in response to the charged amount of the filter cake.

* * * * *